US012667980B2

(12) United States Patent
Zimmer et al.

(10) Patent No.: US 12,667,980 B2
(45) Date of Patent: Jun. 30, 2026

(54) LAYER MODULE FOR HANDLING ROBOT SYSTEM

(71) Applicants: Martin Zimmer, Rheinau (DE);
Günther Zimmer, Rheinau (DE)

(72) Inventors: Martin Zimmer, Rheinau (DE);
Günther Zimmer, Rheinau (DE)

( * ) Notice: Subject to any disclaimer, the term of this patent is extended or adjusted under 35 U.S.C. 154(b) by 518 days.

(21) Appl. No.: 18/025,377

(22) PCT Filed: Sep. 3, 2021

(86) PCT No.: PCT/DE2021/000146
§ 371 (c)(1),
(2) Date: May 11, 2023

(87) PCT Pub. No.: WO2022/053090
PCT Pub. Date: Mar. 17, 2022

(65) Prior Publication Data
US 2024/0025055 A1     Jan. 25, 2024

(30) Foreign Application Priority Data
Sep. 10, 2020    (DE) ..................... 10 2020 005 538.9

(51) Int. Cl.
*B25J 15/04*      (2006.01)
*B25J 19/00*      (2006.01)

(52) U.S. Cl.
CPC ....... *B25J 15/0408* (2013.01); *B25J 19/0033* (2013.01)

(58) Field of Classification Search
CPC .......................... B25J 15/0408; B25J 19/0033
See application file for complete search history.

(56) References Cited

U.S. PATENT DOCUMENTS

| | | | | |
|---|---|---|---|---|
| 9,008,414 | B2 * | 4/2015 | Merkl | .................. A61B 5/7267 |
| | | | | 382/155 |
| 2019/0201036 | A1 * | 7/2019 | Nott | ....................... A61B 34/30 |
| 2020/0054401 | A1 * | 2/2020 | Yu | ........................... A61B 17/00 |
| 2021/0339404 | A1 * | 11/2021 | Miyashita | ............ B25J 15/0408 |

(Continued)

FOREIGN PATENT DOCUMENTS

| | | |
|---|---|---|
| CN | 105121867 A | 12/2015 |
| CN | 106170372 A | 11/2016 |

(Continued)

*Primary Examiner* — Jay Khandpur
(74) *Attorney, Agent, or Firm* — Smartpat PLC

(57) ABSTRACT

A layer module for integration into a handling robot system has an interface bank on the robot side, an interface bank on the handling side, and a third interface bank. The interface bank on the robot side has a geometric connection contour for position-centered fastening to an industrial robot of the robotic handling system or to a robot adapter part, along with a cable feed for receiving a fixed wiring of an electrical functional assembly arranged in the layer module to the industrial robot. The interface bank on the handling side has a geometric connection contour for position-centered releasable joining by a snap connection to a handling tool or to a layer module element connected upstream of the handling tool, along with a group of electrical contacts. The layer module enables the use of an industrial robot in combination with different handling tools and for changing handling tasks.

10 Claims, 7 Drawing Sheets

(56)  References Cited

U.S. PATENT DOCUMENTS

| | | | |
|---|---|---|---|
| 2021/0378119 A1* | 12/2021 | Criminale | ............. H05K 5/069 |
| 2021/0394367 A1* | 12/2021 | Correll | .................. B25J 9/1664 |
| 2022/0009107 A1 | 1/2022 | Zimmer et al. | |
| 2022/0203559 A1* | 6/2022 | Lenglachner | ........ B25J 19/0033 |
| 2022/0234216 A1* | 7/2022 | Dixon | ................... A61B 34/30 |

FOREIGN PATENT DOCUMENTS

| | | |
|---|---|---|
| CN | 205819534 U | 12/2016 |
| CN | 110039575 A | 7/2019 |
| CN | 111388268 A | 7/2020 |
| CN | 116323118 A | 6/2023 |
| DE | 202011002899 U1 | 5/2012 |
| DE | 102017001943 A1 | 8/2018 |
| DE | 102018008648 A1 | 5/2020 |
| EP | 2848378 B1 | 8/2018 |
| JP | 2002218676 A | 8/2002 |
| WO | 2017144310 A2 | 8/2017 |
| WO | 2018187067 A1 | 10/2018 |

* cited by examiner 102     100     92, 104

| Energy storage device |  | Switch |

| NPN-PNP logic / converter |  | Radio module |

106     103

112     109     100     115     114     115

Light-emitting diodes

Sockets

Sockets

Power supply group

Changeover switch

Suppression group

Application computer

Data storage unit

Group of electrical contacts

Group of electrical contacts

Digital input and output unit 111     42     107     42     108     113

92, 104    112    109    100    103    91    115    115

114
116
11
119
118
121
122

111    102    107    42    31    42    108

LAYER MODULE FOR HANDLING ROBOT SYSTEM

CROSS-REFERENCE TO RELATED APPLICATION

This application is a national stage application, filed under 35 U.S.C. § 371, of International Patent Application No. PCT/DE2021/000146, filed on 9 Sep. 2021, which claims the benefit of German Patent Application No. 10 2020 005 538.9, filed 10 Sep. 2020.

BACKGROUND

The disclosure relates to a layer module for integration into a handling robot system.

DE 10 2018 008 648 A1 discloses a layer module in the form of a communication module that forwards external data to electronics arranged in the housing of the gripping unit.

SUMMARY

The disclosure relates to a layer module for integration into a handling robot system, having an interface bank on the robot side, having an interface bank on the handling side and having a third interface bank. The interface bank on the robot side has a geometric connection contour for position-centered fastening to an industrial robot of the robotic handling system or to a robot adapter part, along with a cable feed for receiving a fixed wiring of an electrical functional assembly arranged in the layer module to the industrial robot. The interface bank on the handling side has a geometric connection contour for position-centered releasable joining by means of a snap connection to a handling tool or to a layer module element connected upstream of the handling tool, along with a group of electrical power contacts, signal contacts and data contacts, and a handling robot system having such a layer module and an industrial robot having at least one arm.

The present invention is based on the problem of developing a layer module that enables the use of an industrial robot in conjunction with different handling tools and for changing handling tasks.

This problem is solved with the features of the main claim. For this purpose, the electrical functional assembly is electrically connected on the handling side to the electrical power contacts, signal contacts and data contacts. The electrical functional assembly comprises at least one energy storage device and the third interface bank. The third interface bank is part of an operator interface for temporary control of the signals and/or data transmittable via the interface bank on the handling side, wherein the third interface bank comprises at least one manually operable switching group or a bank of a manually joinable and disconnectable plug connection.

In the handling robot system, the layer module is fastened to the arm of the industrial robot or to a robot adapter part fastened to the arm of the industrial robot and is electrically hardwired to the industrial robot. A layer module element with a handling tool fastened to it is fixed to the layer module by means of a releasable snap connection, or a handling tool is fixed to the layer module by means of a releasable snap connection.

The layer module is fastened as a fixed part to the arm of an industrial robot. Electrically, the layer module is hardwired to the industrial robot. The power, signal and data control of the handling tool is provided by the electrical functional assembly arranged in the layer module. A cable-based transmission to the gripping unit is provided from the layer module. In order to easily adapt the handling robot system to new machining tasks, the interface bank on the handling side is designed for rapid change. The interface on the handling side is mechanically designed as a releasable snap connection for this purpose. The electrical connection is made, for example, by means of fixed contacts on one interface bank and spring-loaded contact pins on the other interface bank. When changing the handling tool or workpiece connected to the layer module, programming in the layer module can take place in a tool-specific and workpiece-specific manner. This can be done already during the main time of a previous operation.

Further details of the invention are given in the subclaims and the following description of schematically illustrated embodiments.

DETAILED DESCRIPTION

Figures 1, 2:
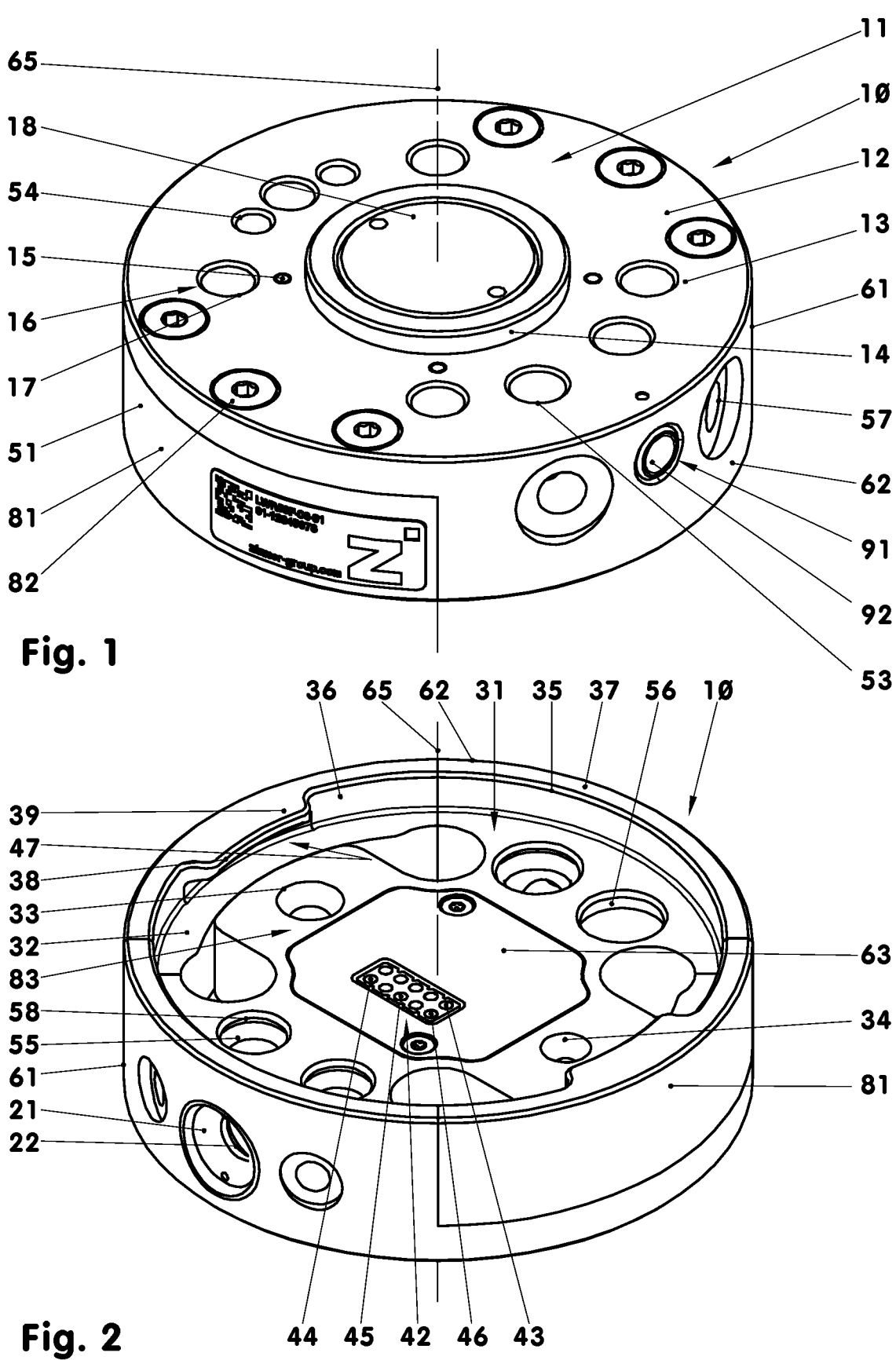
FIG. 1: Layer module with interface bank on the robot side
FIG. 2: Layer module with interface bank on the handling side

FIGS. 1-6 show a layer module (10) and some of its individual parts. The layer module (10) is used in handling robot systems (1), see FIG. 13. The individual handling robot system (1) comprises an industrial robot (2), for example designed as a 6-axis robot in the form of a vertical jointed-arm robot, and a handling tool (4) connected to the industrial robot (2). Another structure of the industrial robot (2), for example in the form of a gantry robot, a column robot, a polar robot, a SCARA robot, etc. is also conceivable.

The layer module (10) is inserted on an arm (3) of the robot (2) between a joint of the robot (2) and, for example, at least one handling tool (4). The handling tool (4) is, for example, a gripping unit (4). The gripping unit (4) can be designed, for example, with rigid active elements (5), with flexible active elements, with magnetic active elements, etc. It can be electrically, pneumatically or hydraulically operated. A gripping unit (4) with rigid active elements (5) is, for example, a parallel gripper with linearly adjustable gripping jaws (5), a gripping unit with pivoting gripping jaws (5), a pincer gripper, etc. A gripping unit with flexible active elements can be, for example, a vacuum gripper, a bellows gripper, etc. With all gripping units (4), the media supply for the drive is provided from the industrial robot (2) via the layer module (10) to the gripping unit (4).

During operation of the handling robot system (1), the handling tool (4) is positioned at the pick-up position and at the deposit position by means of the robot axes. The workpiece is then gripped and released by means of the handling tool (4). Thereby, the movement of the gripping jaws (5) relative to the workpiece, for example, takes place in a workpiece-specific manner.

The layer module (10) has a cylindrical disk shape. It has an interface bank (11) on the robot side and an interface bank (31) on the handling side. The interface bank (11) on the robot side and the interface bank (31) on the handling side form end faces (12; 32) of the layer module (10) turned away from one another. In the exemplary embodiment, the diameter of the layer module (10) amounts to 75 millimeters and its height amounts to 24 millimeters.

FIG. 1 shows an isometric view of the layer module (10) with the interface bank (11) on the robot side. This can be used to fasten the layer module (10) directly to the robot, for example. However, it is also conceivable to arrange a robot adapter part, for example an adapter plate, between the layer module (10) and the robot arm. For position-centered fastening to the arm of the robot or to the robot adapter part, the interface bank (11) on the robot side has a geometric connection contour (13). In the exemplary embodiment, this comprises a centering ring (14) and at least one centering pin receptacle (15) arranged in an off-center manner. It is also conceivable, for example, to use an individual centering pin receptacle, for example of rectangular design, for determining the position of and securing the layer module (10) against rotation at the interface bank (11) on the robot side. Furthermore, in the exemplary embodiment, the geometric connection contour (13) comprises a bore pattern (16) with, for example, four through bores (17) arranged on a common pitch circle. These through bores (17) can be designed as countersunk bores. Fastening screws, for example, are inserted into such through bores (17) for fastening the layer module (10) to the robot adapter part or directly to the robot arm. Another design of fastening the layer module (10) to the robot adapter part or to the robot arm is also conceivable.

Figures 3, 4, 5:
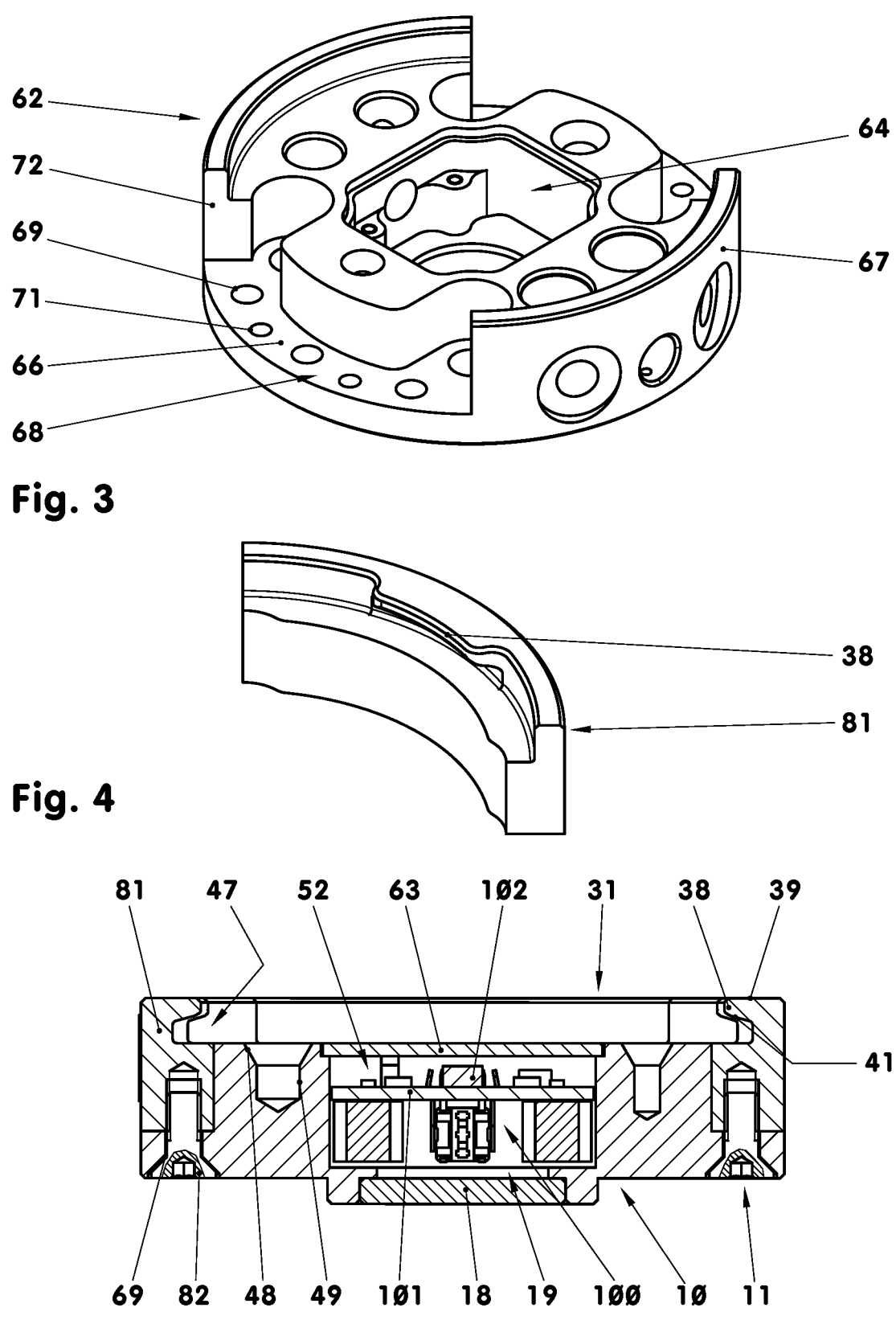
FIG. 3: Base body of the layer module.
FIG. 4: Insert piece.
FIG. 5: Section of the layer module.
Figure 6:
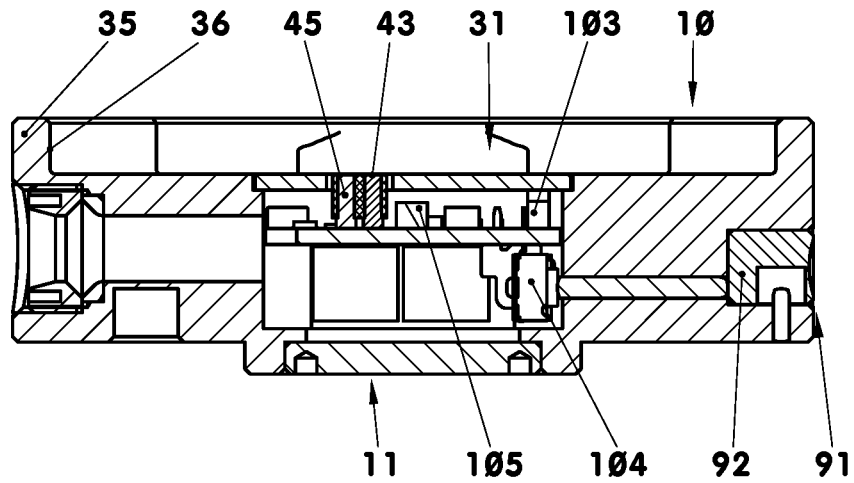
FIG. 6: Cross-section to FIG. 5.

For example, centrally, the interface bank (11) on the robot side in the illustrations of FIGS. 1, 5, and 6 has a removable closure lid (18). In these illustrations, this closure lid (18) closes a cable feed (19) on the end face side. A cable bundle (6), for example, can be guided from the industrial robot (2) to the layer module (10) through such cable feed (19), which forms, for example, a power, signal and data line feed (19). By means of such cable bundle, the layer module (10) is hardwired relative to the robot arm. An additional cable feed (21) is provided on the shell surface (51) of the layer module (10). Such additional cable feed (21), which is designed for example as a power, signal and data line feed (21), can also be designed to be closable. Such additional cable feed (21) can be used as an alternative to the first-mentioned cable feed (19) for routing the electrical connection (6) from the industrial robot into the interior space (52) of the layer module (10). In such a case, the shell surface (51) forms part of the interface bank (21) on the robot side of the layer module (10). It is also conceivable to route only the power lines between the industrial robot (2) and an electrical functional assembly (100) of the layer module (10) through the cable channel (19; 21). The signal exchange and/or the data exchange then take place, for example, wirelessly.

The layer module (10) shown further has two groups of two media connectors (53, 54) each. Such media connectors (53, 54) continue in media lines (55, 56) that penetrate the layer module (10) parallel to its longitudinal axis (65). The two groups of media lines (55, 56) have different diameters. In the exemplary embodiment, the diameter of the narrower media lines (55) amounts to 60% of the diameter of the wider media lines (56). Each of the media lines (55, 56) also has a radially oriented connection (57) that opens into the shell surface (51).

A switch (92) is also arranged on the shell surface (51). This is designed as a manually operated pushbutton. Such switch (92) is part of an operator interface (91) of the layer module (10).

FIG. 2 shows an isometric view of the layer module (10) with the interface bank (31) on the handling side. A layer module element (200), see FIG. 7, or a handling tool (4) can be releasably fixed to such interface bank (31) on the handling side. In the exemplary embodiment, the interface bank (31) on the handling side has as parts of a geometric connection contour (83) two guide element receptacles (33, 34) arranged in an off-center manner. Such guide element receptacles (33, 34) have a different depth, for example. They are oriented parallel to the longitudinal axis (65). The guide element receptacles (33, 34) have different cross-sections. In the illustrations of FIGS. 2 and 5, the guide element receptacle (33) shown on the left has a larger cross-sectional area than the guide element receptacle (34) shown on the right.

In the exemplary embodiment, the layer module (10) is designed to be shell-shaped at the interface bank (31) on the handling side. It has a free-standing circumferential edge (35) of constant height. The inner wall (36) of the edge (35) forms a radial centering ring (36). For example, the end face (37) of the edge (35) lies in a normal plane to the longitudinal axis (65). Two edge sections opposite to one another are designed as circumferential edges (38). In the exemplary embodiment, the circumferential edges (38) each cover a sector of 36 degrees. Such circumferential edges (38) are oriented inward. In cross-section, the circumferential edges (38) are designed to be wedge-shaped. Their upper side (39) and its lower side (41) enclose an angle of 5 degrees in the exemplary embodiment. The apex line of such angle is oriented in the direction of the longitudinal axis (65).

Offset from the longitudinal axis (65), a group of electrical contacts (42) is arranged on the interface bank (31) on the handling side. In the exemplary embodiment, the group of electrical contacts (42) comprises ten contacts with contact surfaces (43) on the end face side. These are electrical power contacts (44), signal contacts (45) and data contacts (46). Such contacts (44-46) are arranged in two rows, for example. In the illustration of FIG. 2, the contact surfaces (43) lie in a common plane fixed relative to the housing (61) of the layer module (10) normal to the longitudinal axis (65). Instead of being rigid, the electrical contacts (44-46) can be spring-loaded individually or as a group.

The media lines (55, 56) each have a sealing element (58), for example an O-ring, at the interface bank (31) on the handling side.

The housing (61) of the layer module (10) has a base body (62), see FIG. 3, and two insert pieces (81) inserted into it, see FIG. 4. A lid (63) arranged on the interface bank (31) on the handling side closes a central region (64) of the layer module (10).

The base body (62) has a base (66) and two external wall regions (67). Depressions (68) are designed between the wall regions (67) to accommodate the insert pieces (81). In the exemplary embodiment, the two depressions (68) have the same size. In addition to the through bores (17), two groups of three counterbores (69) each penetrate the base (66). Such counterbores (69) open into contact surfaces of the recesses (68). Centering bores (71) are introduced between the counterbores (69).

Each of the two recesses (68) cover a sector angle of 90 degrees. The boundary surfaces (72) of the recesses (68) are oriented radially to the longitudinal axis (65), for example.

In the exemplary embodiment, the base body (62) is made of aluminum. For example, the modulus of elasticity of such material amounts to 70000 newtons per square millimeter.

In the exemplary embodiment, the two insert pieces (81) are designed to be identical to one another. They have the shape of shell section. In the upper region, the circumferential edges (38) are designed on the insert pieces (81).

For example, the insert pieces (81) are made of steel. The modulus of elasticity of such material amounts to 210,000 newtons per square millimeter. Thus, such modulus of elasticity amounts to three times the modulus of elasticity of the base body (62). The materials may be selected so that the modulus of elasticity of the insert pieces (81) amounts to more than twice the modulus of elasticity of the base body (62). It is also conceivable to use the insert pieces (81) as replacement parts. For this purpose, they may be made of a plastic, for example.

When assembling the layer module (10), each of the insert pieces (81) is inserted into a recess (68). Centering pins and fastening screws (82) inserted in the counterbores (69) hold and secure the insert pieces (81). The electrical functional assembly (100) is inserted into the central region (64) of the base body (62). Such central region (64) is then closed, for example by means of the lid (63).

FIGS. 5 and 6 show sectional views orthogonal to one another of the layer module (10). In these illustrations, the interface bank (11) on the robot side is shown at the bottom and the interface bank (31) on the handling side is shown at the top.

Each of the two circumferential edges (38) bounds a snap element receptacle (47). The two snap element receptacles (47) are formed as mirror images of one another. They are opposite one another.

Each of the two guide element receptacles (33, 34) has an inlet slope (48) and a cylindrical receptacle region (49). Thereby, for example, the cylindrical receptacle region (49) of the smaller diameter guide element receptacle (34) is longer than the cylindrical receptacle region of the larger diameter guide element receptacle (33).

The electrical functional assembly (100) is arranged between the two guide element receptacles (33, 34) in the interior space (52) of the layer module (10). This comprises, for example, a circuit board (101) on which at least one energy storage device (102), a radio module (103) and a switching element (104) are arranged.

The energy storage device (102) is formed, for example, by a capacitor used in a DC circuit. During high accelerations of the handling tool, additional power can be made available to the drive motors of the handling tool (4) by means of such energy storage device (102). This can be used, for example, to reduce feedback effects from consumption peaks on the industrial robot (2).

For example, the radio module (103) has a transmitter and a receiver. Both the transmitter and the receiver are designed for a frequency in the range of 2.4 gigahertz, for example. Thereby, the respective frequencies in this range can adapt to the frequency of the counterpart station. For example, the voltage applied to the radio module (103) amounts to 3.1 to 4.2 volts. The bidirectional radio module is designed to be, for example, asynchronous serial, for example as UART, Bluetooth, WLAN, etc.

The switching element (104) is further arranged on the circuit board (101). This can be switched by means of the pushbutton (92) that can be actuated from the shell surface (51) of the layer module (10). In the exemplary embodiment, the pushbutton (92) together with the switching element (104) forms a switching group (92, 104) in the form of a multifunction pushbutton (92, 104). For example, pressing the pushbutton (92) several times switches the electrical functional assembly (100) between different operating modes.

The circuit board (101) is connected by means of the channel-like power, signal and data feed (19, 21) both to the shell surface (51) and to the end face (12) on the robot side.

After inserting the electrical functional assembly (100) into the interior space (52) of the layer module (10), the pushbutton (92) is mounted, for example, such that it rests against the switching element (104). If necessary, an intermediate tappet can be inserted between the switch (92) and the switching element (104). Another sequence of the assembly of the layer module is also conceivable.

When mounting on the arm (3) of the industrial robot, the layer module (10) is centered on the arm (3) of the industrial robot (2) with the interface shoulder (11) on the robot side and fastened by means of screws inserted in the through bores (17). An electrical cable (6) or a cable composite led out of the arm of the industrial robot, for example laterally or centrally, is passed through a strain relief (22) of the power, signal and data feed (19; 21) and is fastened to a terminal block (105) of the circuit board (101). It is also conceivable to lead the cable (6) for power, signal and data transmission out of the layer module (10) and fasten it to the industrial robot (2). It is also conceivable to use a separate cable (6) or cable bundle that is fastened both to the industrial robot (2) and in the layer module (10).

The layer module (10), which is fastened to and hardwired to the industrial robot (2), initially has a free interface bank (31) on the handling side. Such interface bank (31) on the handling side comprises a geometric connection contour (83) for position-centered releasable joining with a handling tool (4) or with a layer module element (200) upstream of the handling tool (4). It also comprises a group (42) of electrical power contacts (44), signal contacts (45) and data contacts (46). Furthermore, in the exemplary embodiment, media lines (55, 56) in the form of pneumatic lines are provided at such interface bank (31) on the handling side.

Figure 7:
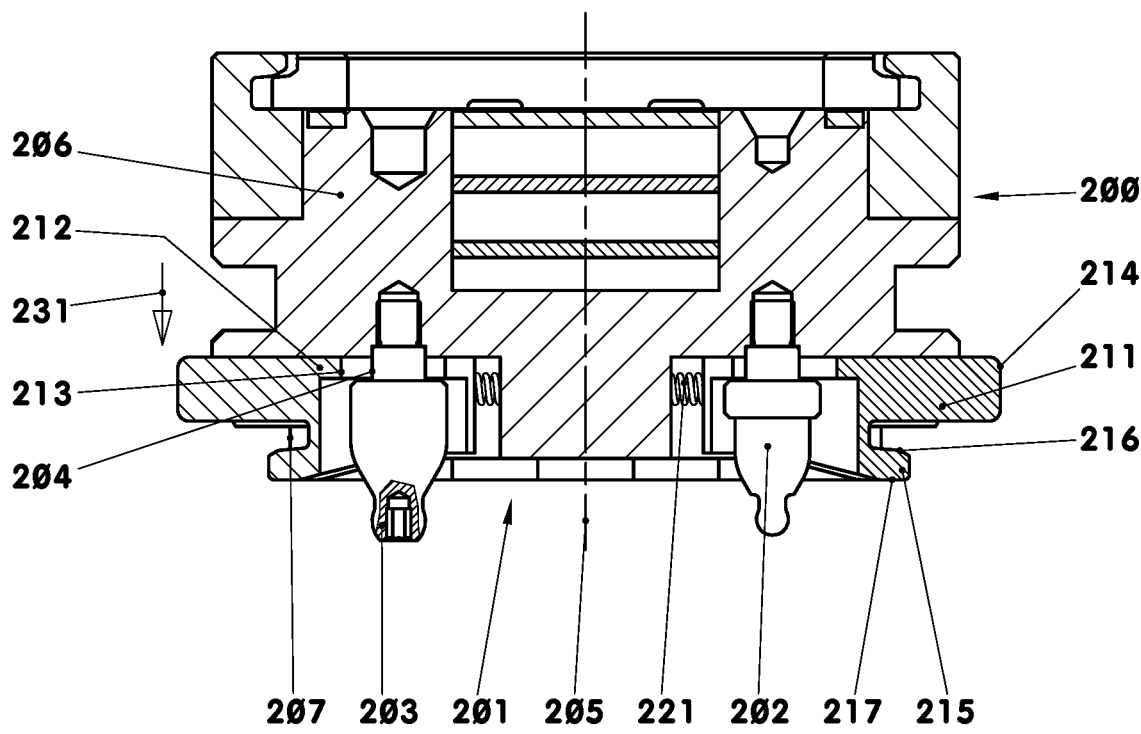
FIG. 7: Layer module element.
Figure 13:
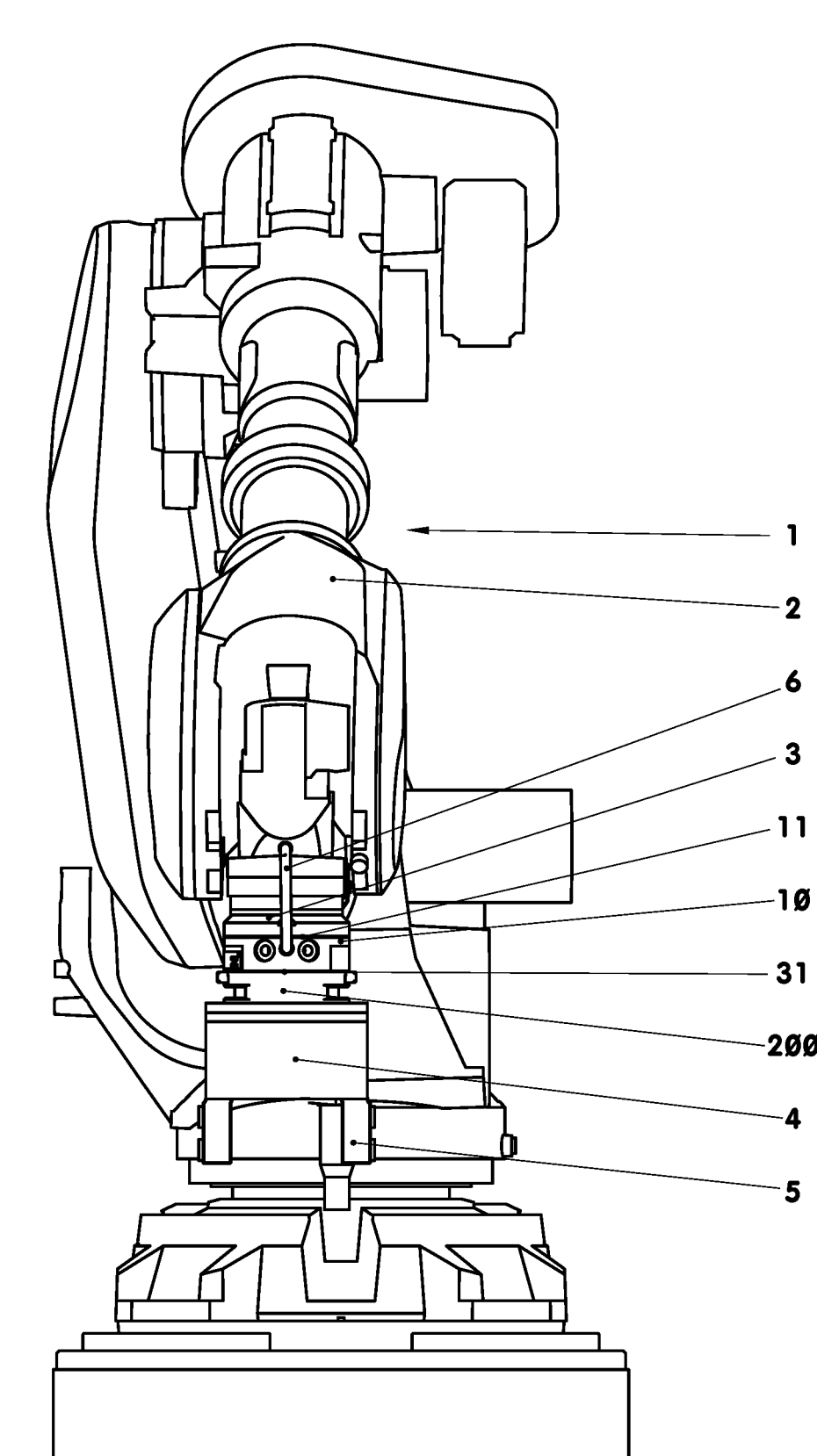
FIG. 13: Handling robot system.

The layer module element (200) shown in FIG. 7, for example, is connected to such interface bank (31) on the handling side, see FIG. 13. The layer module element (200) has an interface bank side (201) complementary to the interface bank (31) on the handling side of the layer module (10). In the exemplary embodiment, this has two guide elements (202, 203) of different cross-sections. The distance between the two guide elements (202, 203) relative to one another and the ratio of their diameters correspond to the respective dimensions of the guide element receptacles (33, 34). It is also conceivable to connect a handling tool (4) to the interface bank (31) on the handling side.

The layer module element (200) further has two locking parts (211, 212) that are opposite one another and can be displaced in the radial direction. In the exemplary embodiment, both locking parts (211, 212) are designed to be identical to one another. The individual locking part (211; 212) has a central guide slot (213) for receiving a guide collar (204) of a respective guide element (202, 203). Together with the respective guide element (202; 203), it limits the stroke of the locking part (211; 212) in the radial direction. The guide slot (213) is oriented radially to the longitudinal axis (205) of the layer module element (200). Such longitudinal axis (205) of the layer module element (200) is aligned with the longitudinal axis (65) of the layer module (10) when the layer module element (200) is connected.

On its outer side, the individual locking part (211; 212) has a gripping region (214). In the illustration of FIG. 7, a projecting hook (215) is arranged below the gripping region (214) and is spaced therefrom. The gripping region (214) protrudes beyond the hook (215) by 30% of the component length measured in the radial direction. The wedge angle between the hook upper side (216) and the hook lower side (217) amounts to 5 degrees in the exemplary embodiment. This is also the size of the angle that the hook upper side (216) encloses with a normal plane to the longitudinal axis (205). Spring elements (221) are arranged between each of the locking parts (211; 212) and the body (206) of the layer element module (200). These load the locking parts (211, 212) in a radially outward manner relative to the body (206). For example, the two locking parts (211, 212) are made of the same material as the insert pieces (81). A different structure of the locking parts (211, 212) is also conceivable. For example, the layer module element (200) can be designed with a single actuating element, which controls all of the locking parts (211, 212).

Furthermore, the interface bank (201) of the layer module element (200) has a group of electrical contact pins (not shown here). These project from the interface bank side (201) under spring load. The arrangement of the group of contact pins corresponds to the arrangement of the group (42) of electrical contacts of the interface bank (31) on the handling side of the layer module (10). For example, each contact (44-46) of the layer module (10) is allocated to a contact pin of the layer module element (200). With the layer module element (200) connected to the layer module (10), the contact pins contact the contacts (44-46) on the layer module side with their end faces. The contacts (44-46) and contact pins may also have the design of a plug or a plurality of plugs and a socket or a plurality of sockets.

The layer module element (200) can have, for example, continuous pneumatic lines. These are oriented parallel to the longitudinal axis (205), for example.

When connecting the layer module element (200) or the handling tool (4) to the layer module (10), the locking parts are loaded, for example manually or by means of a device, against the forces of the spring elements (221). The locking parts (211, 212) are displaced radially toward the longitudinal axis (205) relative to the body (206), until the outer circumference of the hooks (215) is smaller than the inner circumference of the circumferential edges (38). The layer module element (200) is placed on the layer module (10). Thereby, the guide elements (202, 203) are inserted into the guide element receptacles (33, 34). This determines the position of the layer module element (200) relative to the layer module (10). As the two coupling partners (10, 200) approach one another further in the joining direction (231) oriented in the direction of the longitudinal axes (65, 205), the radial centering ring (36) of the layer module (10) engages around the ring collar (207) of the layer element module (200). The contact pins contact the electrical contacts (44-46) of the layer module (10). Thereby, the spring elements of the contact pins are loaded, such that the pressing force of the contact pins against the contacts (44-46) is secured. In addition, the media lines for the liquid and/or gaseous media can be connected, for example, by means of plugging them together.

As soon as the edge (35) of the layer module (10) is in contact with the layer element module (200), for example, the gripping regions (214) are relieved. The locking parts (211, 212) are displaced in a radially outward manner by means of the spring elements (221). The hooks (215) engage behind the circumferential edges (38). Thereby, the upper sides (216) of the hooks (215) slide along the lower sides (41) of the circumferential edges (38). Such spring-loaded expansion causes the two coupling partners (10, 200) to be joined to one another in positive-locking and force-locking manner. Thus, the snap connection between the layer module (10) and the layer module element (200) or a handling tool (4) is self-locking.

To release the joint connection, the locking parts (211, 212) are displaced radially inwards by means of the gripping region (214) or gripping regions (214) under load from the spring elements (221). The snap connection is released. For example, the layer module element (200) can now be lifted off the layer module (10) against the joining direction (231).

The two interface banks (31, 201) of the layer module (10) and the layer module element (200) or the handling tool (4), which are designed to be complementary to one another and can be coupled to one another, can also be designed differently. For example, individual parts of the mechanical adapter geometry (83; 202, 203, 207, 211, 212), electrical contact points or the media connection may be arranged on the respective other interface bank (201; 31). For example, the electrical power contacts (44), signal contacts (45) and data contacts (46) of the layer module (10) can then be spring-loaded.

Figures 8, 9:
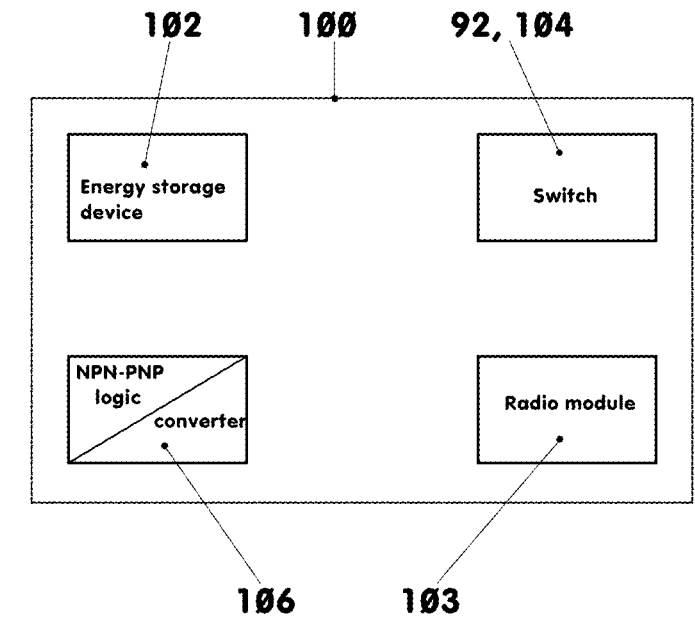
FIG. 8: Block diagram of a first variant of the electric functional assembly.
FIG. 9: Block diagram of a second variant of the electric functional assembly.

FIG. 8 shows a block diagram of a first variant of the electrical functional assembly (100) of the layer module (10). The radio module (103) is designed for data exchange with a mobile or stationary terminal, for example. The third interface bank (91), which forms an interface bank (91) on the operator side, may be used, for example, to read signals or data from the handling tool (4) or to input additional control data for the handling tool (4), for example. In this exemplary embodiment, the energy storage device (102) forms a buffer storage device as described above.

Further, in this exemplary embodiment, the electrical functional assembly (100) possesses an NPN-PNP logic converter (106). This allows the electrical functional assembly (100) to communicate with both currently common logic systems of an industrial robot (2). The switchover can be performed, for example, by means of the multifunction pushbutton (92, 104). Such multifunction pushbutton (92, 104) is also used, for example, to release the industrial robot (2). The industrial robot (2) can be designed as a lightweight robot, for example.

FIG. 9 shows a block diagram of an additional variant of the electrical functional assembly (100). This functional assembly (100) comprises an application computer (107) and a data storage unit (108). The functional assembly (100) has a power supply group (109). In this, for example, the power coming from the industrial robot (2) is converted into the connection data of the handling tool (4) and the application computer (107). The voltage required in the handling tool (4) is, for example, a DC voltage of 24 volts. The power supply group (109) is followed by an interference suppression group (111) for active and passive interference suppression. For example, an energy storage device (102) not shown here is constructed as described in connection with the previous exemplary embodiment.

For example, the application computer (107) has three processors. In the exemplary embodiment, a first processor has a clock frequency of 264 megahertz, another processor has a clock frequency of 1.2 gigahertz and the third processor has a clock frequency of 1.6 gigahertz. Thereby, the former processor is used for external direct control, for example. The circuit board of the application computer (107) has dimensions of 30 millimeters by 30 millimeters, for example. For example, its height including the mounted components amounts to one millimeter. The application computer (107) is fixedly connected to the group (42) of contacts (44-46) on the handling side. For example, from the contact pins on the layer module element side, the handling tool (4) is connected bidirectionally by means of electrical lines. A plurality of handling tools (4) can be controlled from one layer module (10). In the illustration of FIG. 9, the application computer (107) is connected to two groups (42) of electrical contacts. Light-emitting diodes (112) are connected to the application computer (107) to indicate the operating status.

The non-volatile data storage unit (108) connected to the application computer (107) is electrically buffered and has a storage capacity of, for example, two times 16 megabytes. In the exemplary embodiment, it has eight pins. Its dimensions amount to, for example, 8 millimeters by 5.3 millimeters by 2 millimeters.

A digital input and output unit (113) is further connected to the application computer (107). In the exemplary embodiment, this is electrically connected to the data and signal lines of the connecting cable (6) that are routed in the power, data and signal supply (19; 21). Herewith, a digital connection exists between the application computer (107) and the controller of the industrial robot (2). This connection runs via the interface bank (11) on the robot side of the layer module (10).

A changeover switch (114) is arranged between the application computer (107) and the interface bank (91) on the user side. The dimensions of the changeover switch (114) amount to, for example, 9 millimeters by 9 millimeters by 1.6 millimeters. Sockets (115) for two plugs, for example, are arranged on the interface bank (91) on the user side. The sockets (115) are banks (115) of a manually releasable plug connection. By means of such plug connections, for example, external data can be exchanged with the application computer (107) in both directions at a high data transfer rate. A radio module connected to the changeover switch (114) can be provided as another bidirectional user interface. This is designed, for example, as described in connection with the first exemplary embodiment.

When using the electrical functional assembly (100) shown in FIG. 9, the programs and data required for positioning the handling tool (4) are entered into the controller of the industrial robot (2). The data and programs required for controlling the movements of the active elements (5) of the handling tool (4) are fed to the application computer (107) and its data storage unit (108) via the interface bank (91) on the operator side. This can be effected in a wired manner via the sockets (115) or wirelessly via the radio module. The application computer (107) communicates with the controller of the industrial robot (2) by means of digital data, for example for fine control of the positioning for gripping a workpiece. The active elements (5) of the handling tool (4) are controlled by means of the application computer (107). Such control takes place, for example, depending on the structure of the handling tool (4) and on the geometry and structure of the workpiece to be gripped.

If a different workpiece is to be gripped, for example, a different gripping profile can be used on the application computer (107). This means that even workpieces with a batch size of one can be picked up without any problems and without interruption. Thereby, the control of the industrial robot (2) is only adjusted when the positioning of the handling tool (4) changes during gripping. The workpiece-specific control of the active elements (5) of the handling tool (4) is effected solely by means of the application computer (107).

When using another handling tool (4), the tool-specific programs are fed to the application computer (107) via the user interface. In this case as well, the setpoint/actual value comparison during the positioning of the handling tool (4) is effected digitally via the fixed wiring between the application computer (107) and the controller of the industrial robot (2). Thus, the workpiece-specific and/or tool-specific programs for the open-loop or closed-loop control of the gripping elements of the handling tool can be created and used largely independently of the programming of the industrial robot (2). For example, a handling tool-specific programming language can be used.

Figures 10, 11:
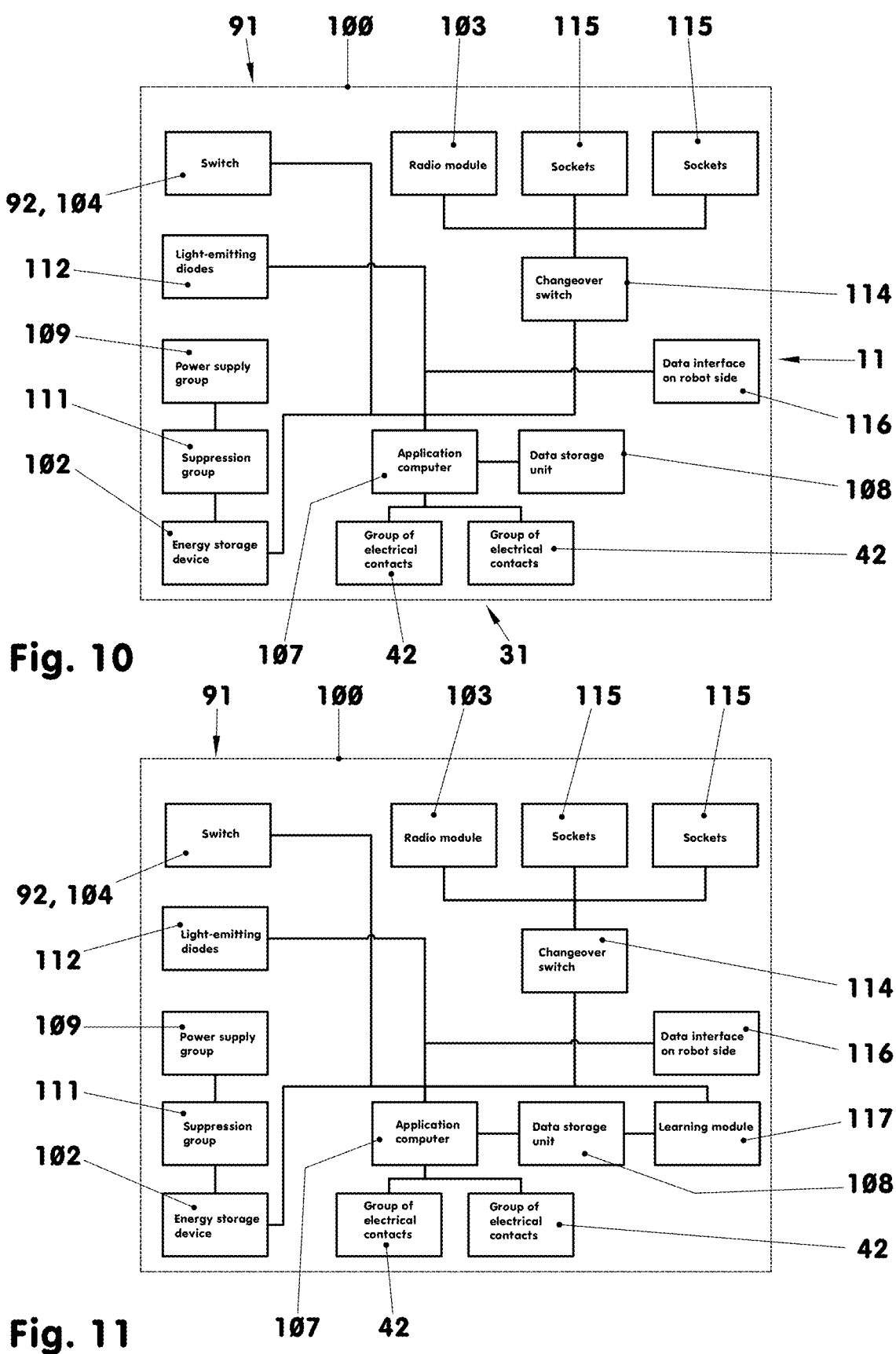
FIG. 10: Block diagram of the variant from FIG. 9 with extended functional scope.
FIG. 11: Block diagram of the variant from FIG. 10 with learning module.

FIG. 10 shows an extended variant of the electrical functional assembly (100) shown in FIG. 9. The application computer (107), the data storage unit (108), and the changeover switch (114), together with the connected components, are designed as described in connection with the previous exemplary embodiment. The power supply group (109) is buffered, such that feedback effects from power peaks, which occur for example when the gripping elements (5) are accelerated, are reduced. An additional radio module (103) is connected to the changeover switch (114). This operates bidirectionally in the range of 2.4 gigahertz or 5 gigahertz, for example. In this exemplary embodiment, the handling-specific programs may also be installed on an external computer. During operation of the handling robot system (1), communication between the application computer (107) and the external computer is effected, for example, via the radio module (103). Outside of the main time of the handling robot system (1), communication between an external computer and the application computer (107) can also be effected via the banks (115) of the plug connection on the interface bank (91) on the operator side.

Furthermore, a switching element (104) is provided. This is part of the switching group (92, 104), for example. This can be operated by the operator by means of the switch (92). This can be used, for example, to switch manually between different operating modes of the application computer (107). The interface between the application computer (107) and the controller of the industrial robot (2) can be designed as described above. However, it can also be designed as a field bus (116). The data interface can also be designed, for example, as an asynchronous serial data interface, for example RS 485.

In this exemplary embodiment, a higher capacity application computer (107) and data storage unit (108) may also be used. Thus, for example, an operating system and/or a programmable logic controller can be installed in the application computer (107). For example, the operating system is a real-time operating system. The programmable logic controller is programmed, for example, via the interface bank (91) on the operator side. The programmable logic controller can control a plurality of handling tools (4). In addition, process data, event data and maintenance data are collected in the application computer (107) and/or data storage unit (108). Such data can then be read out, for example, via the interface bank (91) on the operator side.

FIG. 11 shows a block diagram of an additional variant of the electrical functional assembly (100). Based on the variant of FIG. 10, this electrical functional assembly (100) has an additional learning module (117). The tool-specific and workpiece-specific data determined during processing are condensed. Here, for example, the mean value is formed from a plurality of actual data. Such data can be, for example, power data, data determined by sensors, repeated correction data, etc. For example, data compression is performed for a combination of a handling tool (4) and a workpiece. Such results are incorporated into the target data provided by the application computer (107). When the combination of handling tool (4) and workpiece is used repeatedly, the electrical functional assembly (100) is thus self-learning.

Figure 12:
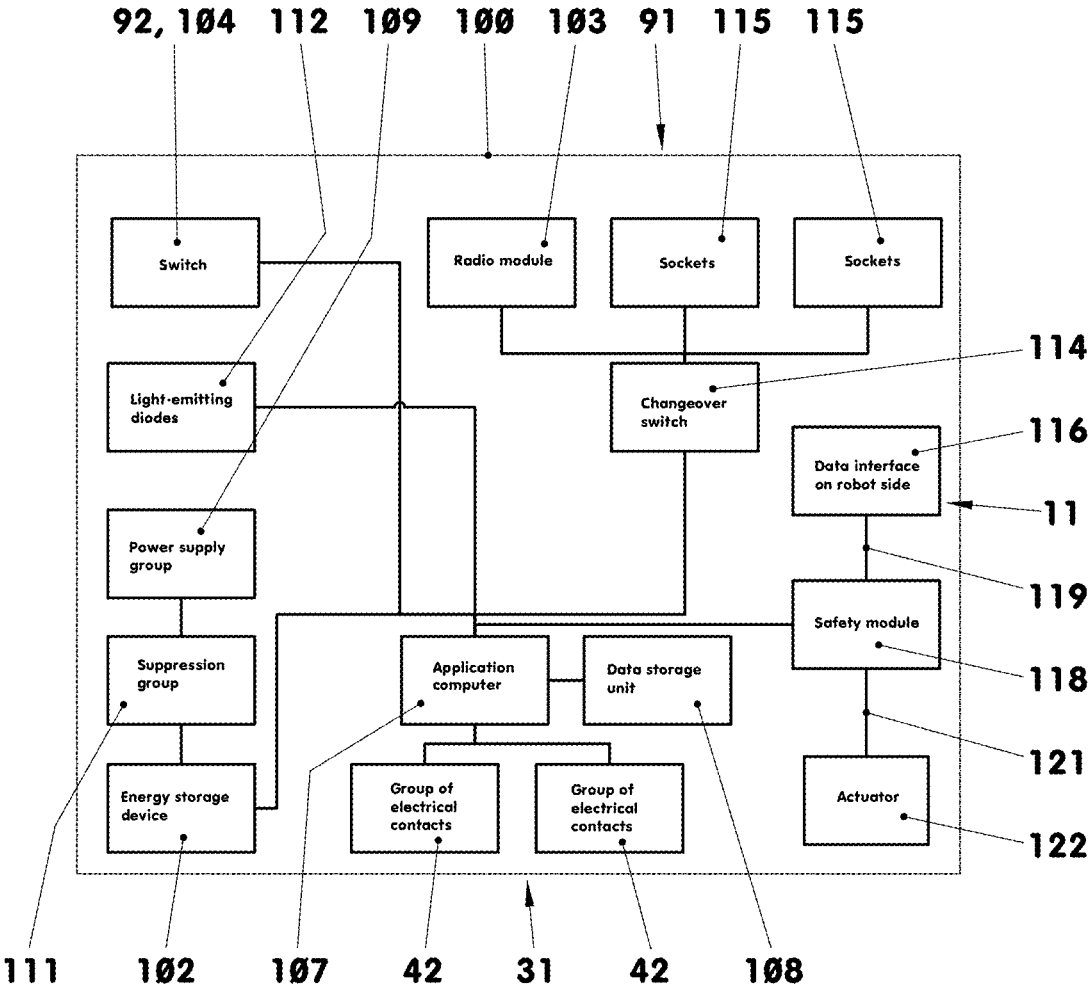
FIG. 12: Block diagram of the variant from FIG. 10 with safety module.

FIG. 12 shows a block diagram of an electrical functional assembly (100), which is also based on the variant of FIG. 10. The variant shown in FIG. 12 has an additional safety module (118). This has, for example, two connectors (119, 121), each of which is designed to be redundant. Furthermore, there is a connection to the application computer (107). One of the connectors (121) is connected to an actuator (122) of the active elements (5) of the handling tool (4). The other connector (119) is connected to the field bus (116). When an external disruption occurs, for example when a safety guard is opened, the active elements (5) of the handling tool (4) are switched in a force-free or force-reduced manner by means of the higher-level controller and the safety module (118). This can be effected, for example, by reducing or switching off the power transmitted via the interface (31) on the handling side. It is also conceivable to transmit a signal to the handling tool (4) via the interface (31) on the handling side to reduce the force or to deactivate the force of the active elements (5). For example, in the case of a positive locking of the active elements (5) with a supported load, secure holding can also be ensured with force-free active elements (5).

It is also conceivable to connect the safety module (118) to a sensor arranged on the handling tool (4). Such sensor can be an inductive or capacitive proximity switch, a photoelectric sensor, etc. For example, in the event of an imminent collision, the proximity switch is damped, or the light barrier is interrupted. When the sensor is switched, an alarm signal is generated in the safety module (118), which is routed to the industrial robot controller via the interface bank (11) on the handling side. The handling tool (4) can now be moved out of the hazardous region, for example, by means of the industrial robot (2).

Combinations of the individual exemplary embodiments are also conceivable.

LIST OF REFERENCE SIGNS

1 Handling robot system
2 Industrial robot
3 Arm of (2)
4 Handling tool, gripping unit
5 Active element of (4), gripping jaw
6 Cable, power, data and signal line
10 Layer module, coupling partner
11 Interface bank on the robot side
12 End face, robot-side
13 Geometric connection contour
14 Centering ring
15 Centering pin receptacle
16 Bore pattern
17 Through bores

12

18 Closure lid
19 Cable feed, power, signal and data feed, end face-side
21 Cable feed, power, signal and data feed, shell-side
22 Strain relief
31 Interface bank on the handling side
32 End face, handling-side
33 Guide element receptacle
34 Guide element receptacle
35 Edge
36 Inner wall of (35), radial centering ring
37 End face of (35)
38 Circumferential edges
39 Upper side of (38)
41 Lower side of (38)
42 Group of electrical contacts
43 Contact surfaces
44 Electrical power contacts
45 Signal contacts
46 Data contacts
47 Snap element receptacle
48 Inlet slope
49 Cylindrical receptacle region
51 Shell surface
52 Interior space
53 Media connectors
54 Media connectors
55 Media line
56 Media line
57 Connection
58 Sealing element
61 Housing
62 Base body
63 Lid
64 Central region
65 Longitudinal axis
66 Base
67 Wall regions
68 Recesses
69 Counterbores
71 Centering bores
72 Boundary surfaces
81 Insert pieces
82 Fastening screws
83 Geometric connection contour of (31)
91 Third interface bank, interface bank on the operator side
92 Switch, part of a switching group, part of a multifunction pushbutton
100 Electrical functional assembly
101 Circuit board
102 Energy storage device
103 Radio module
104 Switching element, part of a switching group, part of a multifunction pushbutton
105 Terminal block
106 NPN-PNP logic converter
107 Application computer
108 Data storage unit
109 Power supply group
111 Suppression group
112 Light-emitting diodes
113 Digital input and output unit
114 Changeover switch
115 Sockets, banks of a plug connection
116 Data interface on the robot side, field bus
117 Learning module
118 Safety module

119 Connector of (118)
121 Connector of (118)
122 Actuator
200 Layer module element, coupling partner
201 Interface bank side
202 Guide element
203 Guide element
204 Guide collar
205 Longitudinal axis of (200)
206 Body of (200)
207 Ring collar
211 Locking part
212 Locking part
213 Guide slot
214 Gripping region
215 Hooks
216 Hook upper side
217 Hook lower side
221 Spring elements
231 Joining direction

The invention claimed is:

1. A layer module (10) for integration into a handling robot system (1), comprising:
an interface bank (11) on a robot side;
an interface bank (31) on a handling side;
a third interface bank (91); and
an electrical functional assembly (100) arranged in the layer module (10),
wherein the interface bank (11) on the robot side has
a geometric connection contour (13) for position-centered fastening to an industrial robot (2) of the handling robot system (1) or to a robot adapter part, and
a cable feed (19; 21) for receiving a fixed wiring of the electrical functional assembly (100) to the industrial robot (2),
wherein the interface bank (31) on the handling side has
a geometric connection contour (83) for position-centered releasable joining by a snap connection to a handling tool (4) or to a layer module element (200) connected upstream of the handling tool (4), and
a group (42) of electrical power contacts (44), signal contacts (45) and data contacts (46),
wherein the electrical functional assembly (100) is electrically connected on the handling side to the electrical power contacts (44), signal contacts (45) and data contacts (46),
wherein the electrical functional assembly (100) comprises at least one energy storage device (102) and the third interface bank (91), and
wherein the third interface bank (91) is part of an operator interface for temporary control of signals and/or data transmittable via the interface bank (31) on the handling side, and
wherein the third interface bank (91) comprises at least one manually operable switching group (92, 104) or a bank (115) of a manually joinable and disconnectable plug connection.

2. The layer module (10) according to claim 1,
wherein at least one media line (55; 56) penetrates both the interface bank (11) on the robot side and the interface bank (31) on the handling side.

3. The layer module (10) according to claim 1,
wherein the cable feed (19) penetrates an end face (12) on the robot side of the layer module (10).

4. The layer module (10) according to claim 1,
wherein the electrical functional assembly (100) comprises a logic level converter (106) switchable by the manually operable switching group (92, 104).

5. The layer module (10) according to claim 1,
wherein the electrical functional assembly (100) comprises an application computer (107) and a data storage unit (108).

6. The layer module (10) according to claim 5,
wherein the electrical functional assembly (100) comprises a data interface (116) on the robot side between the application computer (107) and the interface bank (11) on the robot side in form of a field bus (116) or an asynchronous serial data interface.

7. The layer module (10) according to claim 5,
wherein the application computer (107) comprises an operating system and/or a programmable logic controller.

8. The layer module (10) according to claim 5,
wherein the electrical functional assembly (100) comprises a learning module (117), which condenses application-specific actual data and actual signals fed to the layer module (10) via the data contacts (46) and signal contacts (45) and feeds them to the application computer (107) for determining new target data.

9. The layer module (10) according to claim 6,
wherein the electrical functional assembly (100) has a safety module (118), which evaluates data and signals transmitted to the layer module (10) via the interface bank (11) on the robot side and, depending on the data and signals, reduces power transmitted via the electrical power contacts (44) or outputs a change signal for a handling tool (4) via the signal contacts (45) to reduce a force.

10. A handling robot system (1), comprising:
the layer module (10) according to claim 1; and
an industrial robot (2) having an arm (3),
wherein the layer module (10) is fastened to the arm (3) of the industrial robot (2) or to a robot adapter part fastened to the arm (3) of the industrial robot (2) and is electrically hardwired to the industrial robot (2), and
wherein a layer module element (200) with a handling tool (4) fastened thereto is fixed to the layer module (10) by a releasable snap connection, or wherein a handling tool (4) is fixed to the layer module (10) by a releasable snap connection.

\* \* \* \* \*